United States Patent
Ichimiya et al.

(10) Patent No.: US 11,285,570 B2
(45) Date of Patent: Mar. 29, 2022

(54) METHOD OF MANUFACTURING ENGINE VALVE INTERMEDIATE PRODUCT WITH BOSS PORTION

(71) Applicant: NITTAN VALVE CO., LTD., Hadano (JP)

(72) Inventors: Atsuyuki Ichimiya, Isehara (JP); Kazunori Kurahashi, Nakai-machi (JP)

(73) Assignee: NITTAN VALVE CO., LTD., Hadano (JP)

( * ) Notice: Subject to any disclaimer, the term of this patent is extended or adjusted under 35 U.S.C. 154(b) by 0 days.

(21) Appl. No.: 17/239,692

(22) Filed: Apr. 26, 2021

(65) Prior Publication Data

US 2021/0245309 A1 Aug. 12, 2021

Related U.S. Application Data

(63) Continuation-in-part of application No. PCT/JP2018/039798, filed on Oct. 26, 2018.

(51) Int. Cl.
*B23P 15/00* (2006.01)
*B21J 5/08* (2006.01)

(52) U.S. Cl.
CPC .............. *B23P 15/002* (2013.01); *B21J 5/08* (2013.01); *Y10T 29/49298* (2015.01)

(58) Field of Classification Search
CPC .......... B23P 15/002; B23P 15/00; B21K 1/22; B21J 5/08; B21J 5/12; B21J 9/025;
(Continued)

(56) References Cited

U.S. PATENT DOCUMENTS 1,984,728 A * 12/1934 Colwell ............... F01L 3/14
29/888.451
2,127,929 A * 8/1938 Miller ............. B23P 15/002
29/888.45
(Continued)

FOREIGN PATENT DOCUMENTS

| CN | 107660165 A | 2/2018 |
| JP | S62-114111 U | 7/1987 |

(Continued)

OTHER PUBLICATIONS

International Search Report (ISR) dated Jan. 29, 2019 in PCT/JP2018/039798 which published as WO/2020/084749 A1 on Apr. 30, 2020 and which is the International Application of which the present application is a continuation-in-part.

(Continued)

*Primary Examiner* — Sarang Afzali
(74) *Attorney, Agent, or Firm* — JTT Patent Services, LLC; Gerald T. Peters

(57) ABSTRACT

A method of manufacturing an engine valve intermediate product with a boss portion formed in integral fashion at an outer circumferential surface at an intermediate location on a stem forming portion. The manufacturing method may comprise a stem retaining operation in which an intermediate location of the stem forming portion is retained by a plurality of intermediate jigs removably installable radially with respect to a center of the stem forming portion, and a base end portion is retained by a base end jig. The manufacturing method may further comprise a stem enlarging operation in which compressive forces are applied from both ends of the intermediate product and the boss portion is formed as the intermediate product is made to rotate and alternating loads that cause tensile forces and compressive forces to act in repeated and alternating fashion at the outer (Continued)

circumferential surface of the stem forming portion are applied.

10 Claims, 5 Drawing Sheets

(58) Field of Classification Search
 CPC .. B21J 9/06; B21J 13/02; B21J 13/025; F01L 3/02; F01L 2303/00; F01L 2303/01; F01L 2820/01; F01L 3/00; F01L 3/20
 See application file for complete search history.

(56) References Cited

U.S. PATENT DOCUMENTS

| | | | | |
|---|---|---|---|---|
| 3,867,832 | A * | 2/1975 | Rut | B21J 9/06 72/399 |
| 5,592,913 | A | 1/1997 | Matthews | |
| 6,568,233 | B2 * | 5/2003 | Iura | B21D 17/025 72/101 |
| 7,866,198 | B2 * | 1/2011 | Chilson | B21K 1/06 72/356 |
| 8,522,594 | B2 * | 9/2013 | Okabe | B21J 5/08 72/377 |
| 9,283,615 | B2 * | 3/2016 | Kuriyama | B21K 1/22 |
| 10,654,092 | B2 * | 5/2020 | Kuwahara | B21K 1/46 |
| 2012/0186553 | A1 | 7/2012 | Sugimoto | |
| 2018/0056371 | A1 | 3/2018 | Kuwahara | |

FOREIGN PATENT DOCUMENTS

| | | |
|---|---|---|
| JP | 1995-293213 A | 11/1995 |
| JP | 1996-049512 A | 2/1996 |
| JP | 2006-075877 A | 3/2006 |
| JP | 2010-138899 A | 6/2010 |
| JP | 2010-242632 A | 10/2010 |
| JP | 2012-149589 A | 8/2012 |
| JP | 2016-215273 A | 12/2016 |

OTHER PUBLICATIONS

International Preliminary Report on Patentability (IPRP) dated Nov. 2, 2020 in PCT/JP2018/039798 which published as WO/2020/084749 A1 on Apr. 30, 2020 and which is the International Application of which the present application is a continuation-in-part.

* cited by examiner

| | I | II | III | IV | V | VI | VII | VIII | IX | X | XI | XII |
|---|---|---|---|---|---|---|---|---|---|---|---|---|
| a: stem enlarging procedure (units = HV) | 455 | 455 | 437 | 488 | 493 | 508 | 483 | 478 | 459 | 350 | 356 | 350 |
| b: cutting (units = HV) | 310 | 317 | 320 | 310 | 324 | 310 | 330 | 310 | 320 | 312 | 314 | 320 |
| a/b | 1.47 | 1.44 | 1.37 | 1.57 | 1.52 | 1.64 | 1.46 | 1.54 | 1.43 | 1.12 | 1.13 | 1.09 |

(a)

(b)

(a)

(b)

(c)

METHOD OF MANUFACTURING ENGINE VALVE INTERMEDIATE PRODUCT WITH BOSS PORTION

CROSS-REFERENCE TO RELATED APPLICATION, BENEFIT CLAIM, AND INCORPORATION BY REFERENCE

This application is a continuation-in-part of and claims benefit under 35 USC 120 and 365(c) to copending International Application No. PCT/JP2018/039798, entitled "Method of Manufacturing Intermediate Product with Engine Valve Boss Portion", filed 26 Oct. 2018, the content of which is incorporated herein in its entirety by reference.

FIELD OF THE INVENTION

Art related to a method of manufacturing an engine valve intermediate product equipped with a boss portion in which a boss portion is provided for forming a piston portion and/or vane portion at an engine valve stem forming portion.

BACKGROUND

Engine valves generally include engine valves equipped with piston portions that are made to engage in opening/closing operations by hydraulic pressure acting on a large-diameter piston portion which is provided at a stem portion of outside diameter less than that of the valve head portion, and engine valves equipped with vane portions in which vane portions provided at the stem portion cause flow of exhaust gas to act so as to permit the valve to rotate. Because the piston portion or the vane portion that is formed on the engine valve is exposed to flow of high-temperature exhaust gas, it is desirable that it be formed in such fashion as to be imparted with high strength.

An engine valve having a piston portion and/or vane portion might, for example, be formed by carrying out cutting following forging of a stem member made of metal. More specifically, a metal stem member of prescribed length and of outside diameter greater than that of the piston portion and/or vane portion might be subjected to forging to form a flange-like precursor portion for the valve head portion at the tip end thereof, cutting of the stem member with precursor portion for the valve head portion being carried out to form the valve head portion and piston portion and/or vane portion by cutting these out therefrom. Furthermore, the engine valve which is formed might be treated to increase hardness by causing it to undergo heat treatment so that the piston portion and/or vane portion will be provided with the required high strength.

However, it may be that the heat treatment that such an engine valve having a piston portion and/or vane portion is made to undergo is carried out in such fashion that the entire engine valve is placed in a heat treatment furnace, causing hardening of not only the piston portion or vane portion but of the entire valve. It is desirable that the engine valve neck portion (the necked portion that is continuous with both the stem portion and the valve face which comes in repeated contact with the valve seat of the cylinder head) be provided with such toughness (resilience) as will permit it to absorb impact and prevent fracture when the valve face comes in contact with the valve seat. However, where heat treatment causes strength of the neck portion to be increased such that it is equivalent to that of the piston portion and/or vane portion, because there is a possibility that this will decrease the toughness of the neck portion and cause occurrence of fracture, a method has been sought in the context of manufacture of engine valves equipped with piston portions and/or vane portions such as will cause only the piston portion and/or vane portion to be have the required high strength while suppressing increase in strength at locations other than the piston portion and/or vane portion.

Another approach that may be employed is a method in which, at an intermediate portion of a metal stem member of constant outside diameter, a stem-enlarged portion, the outside diameter of which is larger than that of the original stem member, is formed so as to cause this to be a stepped member. For example, such a stepped member may be such that the two ends of a stem member made of metal are retained by a pair of sleeves in the shapes of cylinders that are closed at one end, the stem member being made to rotate while a bent portion is formed at the stem member between the two sleeves and alternating stresses that cause compressive forces and tensile forces to act in alternating and repeated fashion in a direction parallel to the axis of the stem are made to occur at the bent portion, causing a large-diameter stem-enlarged portion to be formed between the two sleeves when compression of the bent portion, the yield stress of which has been lowered as a result of said alternating stresses, is made to occur from either side of the stem portion, causing this to be raised in radially outward fashion.

However, this approach has the disadvantage that because the outer circumferential surface must be retained by the sleeves at locations in the vicinities of the two ends of the stem member, and because the outer circumferential surface extending in the stem direction is of short grippable length at the valve head forming portion that will form one end of the intermediate product, while it may be possible for the outer circumferential surface to be retained by the sleeves, retention thereof tends to be unstable.

Furthermore, the boss portion (enlarged portion) formed in accordance with this approach is formed within a region bounded by the sleeves that are attached to the two end portions of the stem member. This being the case, if the two ends at the valve head forming portion and the stem forming portion are retained by sleeves, the only locations available for enlargement and formation of the boss portion along the base end portion of the valve head forming portion will be those that are continuous with the valve head forming portion. Because the piston portion or the vane portion formed at the stem portion in the engine valve finished product are desirably formed at a location separated by some distance from the valve head portion so as to accommodate the stroke of the valve head portion as the valve opens and closes, it will be problematic if the boss portion of the intermediate product at which the piston portion or the vane portion will be formed is incapable of being formed at a location that is separated by some distance from the valve head forming portion.

There is therefore a need for a method of manufacturing an engine valve intermediate product with boss portion such as will cause only a boss portion for formation of a piston portion and/or vane portion to be of high strength, and/or such as will permit the boss portion to be formed at any desired location separated by some distance from a valve head forming portion at a stem forming portion.

SUMMARY OF INVENTION

One or more embodiments of the present invention may address the foregoing and/or other market needs by providing a method of manufacturing an engine valve intermediate product with a boss portion at which a valve head forming portion, a maximum outside diameter of which is greater than that of a stem forming portion, is present in integral fashion at a tip end portion of the stem forming portion, and at which the boss portion, an outside diameter of which is greater than that of the stem forming portion, is formed in integral fashion at an outer circumferential surface at an intermediate location of the stem forming portion, comprising a stem retaining operation in which an intermediate location of the stem forming portion is retained by a plurality of intermediate jigs capable of being removably installed radially with respect to a center of the stem forming portion of the intermediate product, and a base end portion of the stem forming portion is retained by a base end jig; and a stem enlarging operation in which compressive forces are applied from both ends of the intermediate product and the boss portion is formed as the intermediate product is made to rotate and alternating loads that cause tensile forces and compressive forces to act in repeated and alternating fashion in a direction parallel to a central axis of the stem at the outer circumferential surface of the stem forming portion are applied thereto.

That is, one embodiment of the present invention is a method of manufacturing an engine valve intermediate product with a boss portion at which there is a valve head forming portion.

The valve head forming portion may consist of a neck forming portion and a face forming portion. The neck forming portion may be formed so as to increase in diameter in concave fashion as one proceeds from a base end portion which is continuous with the stem forming portion toward a tip end portion. The face forming portion may be continuous with the tip end portion of the neck forming portion. The neck forming portion and the face forming portion may be present in integral fashion at a tip end portion of the stem forming portion.

An outside diameter of the boss portion may be greater than that of the stem forming portion. The boss portion may be formed in integral fashion at an outer circumferential surface at an intermediate location at the stem forming portion.

In one embodiment, the method of manufacturing the engine valve intermediate product with the boss portion may comprise a stem retaining operation.

At the stem retaining operation, a face forming portion, an outside diameter of which is greater than that of the stem forming portion of the intermediate product, may be inserted in and retained by a retaining hole in such fashion as to cause a bottom face of the valve head forming portion of the intermediate product to come in contact with a bottom of a valve head jig which is in a shape of a cylinder that is closed at one end.

At the stem retaining operation, an intermediate location of the stem forming portion may be retained by a plurality of intermediate jigs capable of being removably installed radially with respect to a center of the stem forming portion of the intermediate product.

At the stem retaining operation, the valve head jig may be inserted in and an outer circumferential surface thereof may be retained by a retaining hole at a tip end jig which is in a shape of a cylinder that is closed at one end and the plurality of intermediate jigs may further be inserted in and outer circumferential surfaces thereof be retained by a retaining hole at the tip end jig.

At the stem retaining operation, a base end portion of the stem forming portion may be retained by a base end jig.

The method of manufacturing the engine valve intermediate product with the boss portion may further comprise a stem enlarging operation.

At the stem enlarging operation, compressive forces may be applied from both ends of the intermediate product and the boss portion may be formed as the stem forming portion of the intermediate product is made to rotate while it is bent in angular fashion in the vicinity of base end faces of the intermediate jigs and alternating loads that cause tensile forces and compressive forces to act in repeated and alternating fashion in a direction parallel to a central axis of the stem at the outer circumferential surface of the stem forming portion are applied thereto.

In some embodiments, the fact that not the valve head forming portion of the intermediate product but an intermediate location at the stem forming portion thereof is retained by a plurality of intermediate jigs capable of being removably installed radially and the fact that there is a base end jig that retains the base end portion of the stem forming portion of the engine valve intermediate product permit the intermediate product to be retained in stable fashion.

Furthermore, in some embodiments, because only the boss portion (the location at which a piston portion or valve head portion will be formed in the finished product) which is formed into a stem-enlarged portion at the stem forming portion of the engine valve intermediate product is subjected to alternating stresses and is made to have higher hardness than that at other locations (locations other than the boss portion at the intermediate product), increase in strength is suppressed and toughness is maintained at the neck forming portion (the location that is continuous with both the stem forming portion and the face forming portion at the intermediate product), such that only the piston portion or vane portion which is formed at the boss portion will have the required high strength.

Furthermore, in some embodiments, because the plurality of intermediate jigs are arranged at locations on the stem forming portion that are between the valve head forming portion and the base end jig, the boss portion which is formed at the stem forming portion will be formed at a location that is separated by some distance from the valve head forming portion along the base end portions of the intermediate jigs.

Furthermore, it is preferred that the method of manufacturing the engine valve intermediate product with the boss portion be such that the plurality of intermediate jigs are formed so as to have hardnesses of not less than 500 HV as a result of having been made to undergo surface treatment and/or heat treatment, and be such that an intermediate location at the stem forming portion is retained at not less than three locations in a circumferential direction of the stem forming portion.

In some embodiments, causing the intermediate jigs to have hardnesses of not less than 500 HV as a result of causing these to undergo surface treatment and/or heat treatment may make it possible for there to be no occurrence of buckling at the intermediate jigs when alternating loads or the like are applied to the intermediate product during the stem enlarging operation. In some embodiments, causing retention by the plurality of intermediate jigs to be carried out at not less than three locations in a circumferential direction about the stem forming portion may make it less likely for forces to be dissipated toward the exterior in the radial direction of the engine valve intermediate product when the boss portion is formed on the stem forming portion than would be the case were retention to be carried out at two locations in a circumferential direction thereabout, as a result of which it may be possible to reduce occurrence of vibration at the intermediate product.

Furthermore, it is preferred that the method of manufacturing the engine valve intermediate product with the boss portion be such that the plurality of intermediate jigs retain the intermediate location of the stem forming portion in such state as to be arranged in equipartite fashion about the circumferential direction of the stem forming portion.

In some embodiments, when the plurality of intermediate jigs are arranged with uniform spacing in the circumferential direction, and the outer circumferential surface of the stem forming portion is retained by way of respectively uniform forces directed toward the center of the stem from radially outward directions, this may make it less likely for forces to be dissipated toward the exterior in the radial direction of the engine valve intermediate product when the boss portion is formed on the stem forming portion, as a result of which it may be possible to reduce occurrence of vibration at the intermediate product.

Furthermore, it is preferred that the method of manufacturing the engine valve intermediate product with the boss portion be such that the engine valve intermediate product with the boss portion is formed from precipitation hardenable Ni-based alloy.

In some embodiments, when the boss portion of the intermediate product is formed from precipitation hardenable Ni alloy and this is subjected to work hardening, the piston portion or vane portion which is formed at the boss portion can be made to have the required high strength.

Furthermore, it is preferred that the method of manufacturing the engine valve intermediate product with the boss portion be such that it further comprises a friction welding operation in which a second boss portion of a stem end member equipped with the second boss portion which is formed from a different material that is martensite steel is joined to the boss portion of the intermediate product to form a secondary intermediate product.

In some embodiments, causing two bosses that are separate bodies of differing hardnesses to be joined to form a boss respectively having a region toward the tip end and a region toward the base end may make it possible for the boss to be formed such that hardness in the region toward the tip end which is near the valve head forming portion that is affected by high temperatures is high, and such that hardness in the region toward the base end which is not affected by high temperatures is low.

Furthermore, it is preferred that the method of manufacturing the engine valve intermediate product with the boss portion be such that the valve head forming portion has a neck forming portion. In such an embodiment, it is furthermore preferred that the neck forming portion be formed in integral fashion so as to be continuous with the tip end portion of the stem forming portion, and so as to be of such shape as to increase in diameter as one proceeds from the tip end portion of the stem forming portion toward a tip end of the neck forming portion.

In some embodiments, the fact that the plurality of intermediate jigs retain not the valve head forming portion but an intermediate location at the stem forming portion may make it possible for the intermediate product to be retained in stable fashion. In some embodiments, the fact that these are arranged between the valve head forming portion and the base end jig at the stem forming portion may make it possible for the boss portion to be formed at any desired location separated by some distance from the valve head forming portion at the stem forming portion. In such an embodiment, it will be the case that the boss portion which is formed will be formed without cutting and without waste, and will be such that the piston portion and/or vane portion of the finished product will be made to have the required high strength as a result of having been subjected to work hardening.

BENEFIT OF INVENTION

In accordance with a method of manufacturing an engine valve intermediate product with boss portion according to at least some embodiments of the present invention, because the fact that intermediate jigs retain an intermediate location at the stem forming portion of the intermediate product in stable fashion makes it possible without causing the entire intermediate product to undergo heat treatment for only the boss portion to be hardened such that it is possible for only the strength of the piston portion and/or vane portion of the finished product to be increased to the required high strength, it may be possible for the toughness of the neck portion and so forth in the finished product to not be lowered but to be maintained, and/or it may be possible to cause a high-precision boss portion to be formed at any desired location at the stem forming portion.

In accordance with a method of manufacturing an engine valve intermediate product with boss portion according to at least some embodiments of the present invention, because it is possible without causing occurrence of damage to the intermediate jigs to carry out stem-enlarged formation of the boss portion at the intermediate product, and because the fact that the degree to which forces are dissipated in such fashion as to be directed toward the exterior in the radial direction when the boss portion is formed is reduced causes vibration at the intermediate product to tend not to occur, it may be possible to improve the precision of the boss portion which is formed at the stem forming portion.

In accordance with a method of manufacturing an engine valve intermediate product with boss portion according to at least some embodiments of the present invention, because when the boss portion is formed a plurality of intermediate jigs retain an intermediate portion of the stem forming portion by way of uniform forces and reduce the tendency for vibration to occur at the intermediate product, it may be possible to further improve the precision of the boss portion which is formed at the stem forming portion.

In accordance with a method of manufacturing an engine valve intermediate product with boss portion according to at least some embodiments of the present invention, the piston portion and/or vane portion formed at the boss portion may be made to have the required high strength.

In accordance with a method of manufacturing an engine valve intermediate product with boss portion according to at least some embodiments of the present invention, by causing a boss portion at the intermediate product which following completion of the engine valve will tend to be affected by the high temperatures of the combustion chamber to be made to have high hardness and increased strength at elevated temperatures, using martensite steel which is cheaper than precipitation hardenable Ni alloy to form a boss portion at a stem end member which tends not to be affected by high temperatures, and joining the boss portions at the intermediate product, it may be possible to reduce the overall manufacturing cost of the engine valve.

In accordance with a method of manufacturing an engine valve intermediate product with boss portion according to at least some embodiments of the present invention, in the context of an engine valve intermediate product having a valve head forming portion at which a maximum outside diameter is greater than that of a stem forming portion, it may be possible to cause a high-precision boss portion to be formed at any desired location at the stem forming portion, and it may be possible without carrying out heat treatment to cheaply form a boss portion having the required high strength at an engine valve intermediate product which is formed from materials that are inexpensive and of low strength.

BRIEF DESCRIPTION OF DRAWINGS

Many aspects of the invention can be better understood with reference to the attached drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

A first working example related to a method of manufacturing an engine valve intermediate product equipped with a boss portion will be described in accordance with FIG. 1. At FIG. 1, in describing an engine valve, the side toward valve head forming portion 4 is taken to be the tip end thereof, and the side toward stem forming portion 3 is taken to be the base end thereof.

Figure 1:
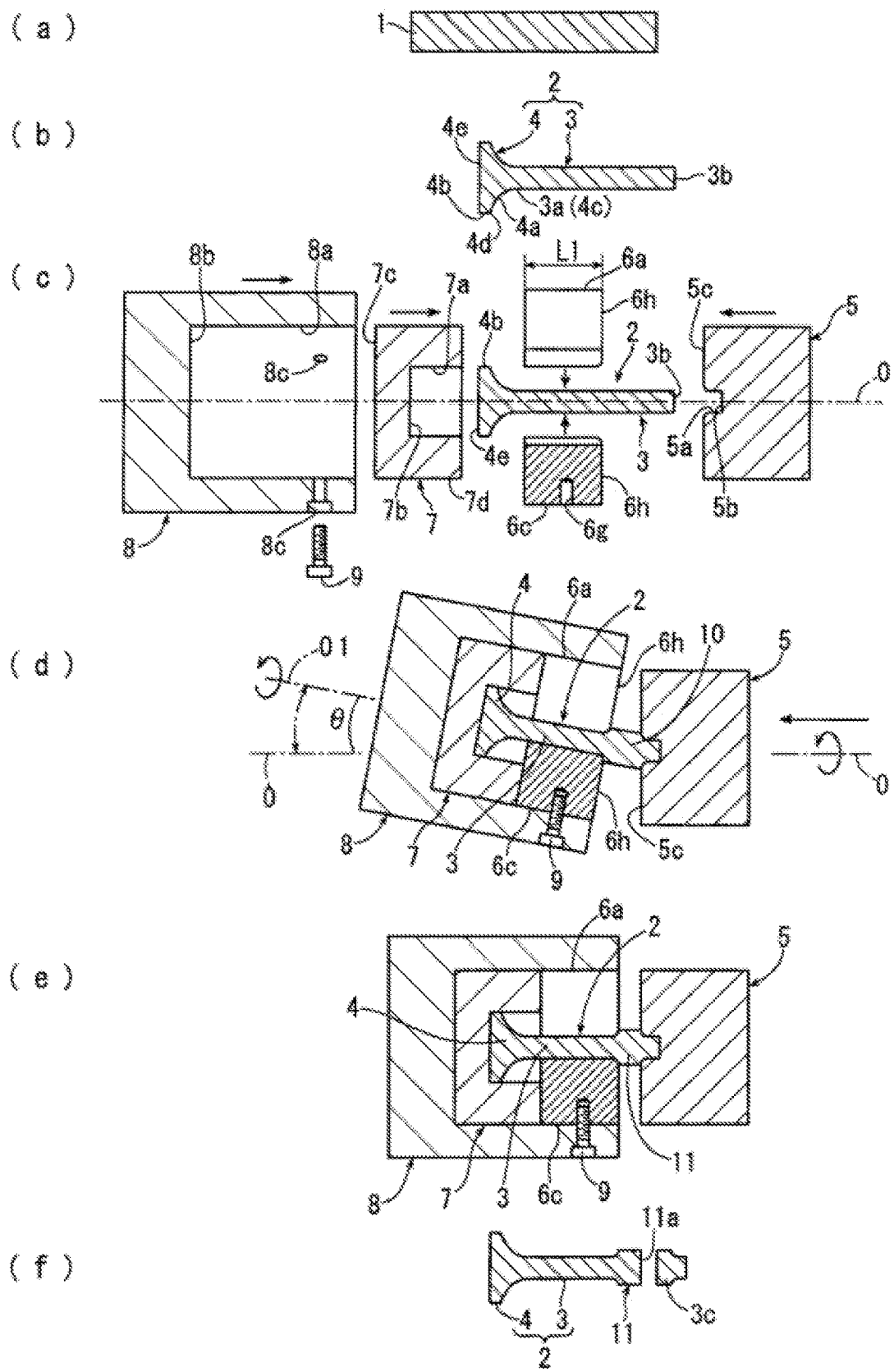
FIG. 1 illustrates manufacturing operations related to a first working example showing a method of manufacturing an engine valve intermediate product equipped with a boss portion, (a) showing an axial sectional view of a solid rod serving as material for a valve; (b) showing an axial sectional view of an engine valve intermediate product having a forged valve head forming portion and stem forming portion; (c) showing a stem retaining operation in which an intermediate location of the stem forming portion of the intermediate product is gripped by an intermediate jig, and the base end of the stem forming portion is rotatably retained by a base end jig; (d) showing a first stem enlarging operation in which alternating stresses are applied to part of the stem forming portion as the intermediate product stem forming portion is made to rotate while it is bent relative to central axis 0, and the intermediate product, the yield stress of which has been lowered, is compressed from both ends; (e) showing a second stem enlarging operation in which the stem forming portion equipped with boss portion that has been made to rotate while bent is bent back so as to be made linear; and (f) showing a removal operation in which a residual portion formed at the base end portion of the stem forming portion is removed.

Metal rod 1 at (a) in FIG. 1 is formed by cutting long rod stock comprising NCF80A or other such precipitation hardenable Ni-based alloy having heat resistance with respect to cutting operations. Forging operations are employed to cause metal rod 1 to be made into intermediate product 2 of shape such that stem forming portion 3 shown at (b) in FIG. 1 and valve head forming portion 4, the outside diameter of which is greater than that of the stem forming portion, are formed in integral fashion at tip end portion 3a of stem forming portion 3. More specifically, intermediate product 2 is formed by means of upset forging or the like, valve head forming portion 4 consisting of neck forming portion 4a which is formed so as to increase in diameter in concave fashion as one proceeds from base end portion 4c toward tip end portion 4d, and face forming portion 4b which is continuous with tip end portion 4d of neck forming portion 4a. Valve head forming portion 4 is continuous with tip end portion 3a of stem forming portion 3 at base end portion 4c of neck forming portion 4a. The upset-forged intermediate product 2 undergoes treatment to correct the strain produced as a result of forging and for roughing of the outside diameter.

As shown at (c) in FIG. 1, intermediate product 2 is thereafter subjected to a stem retaining operation in which an intermediate location and base end portion 3b of stem forming portion 3 are retained by respective jigs. More specifically, base end jig 5 which has retaining hole 5a with bottom 5b is such that inserting base end portion 3b of stem forming portion 3 into retaining hole 5a so that it comes in contact with bottom 5b causes intermediate product 2 to be retained in such fashion as to permit relative rotation with respect to base end jig 5, and an intermediate location of stem forming portion 3, i.e., the outer circumferential surface of that portion of stem forming portion 3 which is bounded by front face 5c of base end jig 5 and neck forming portion 4a, is moreover retained by a plurality of intermediate jigs 6a through 6c.

Figure 2:
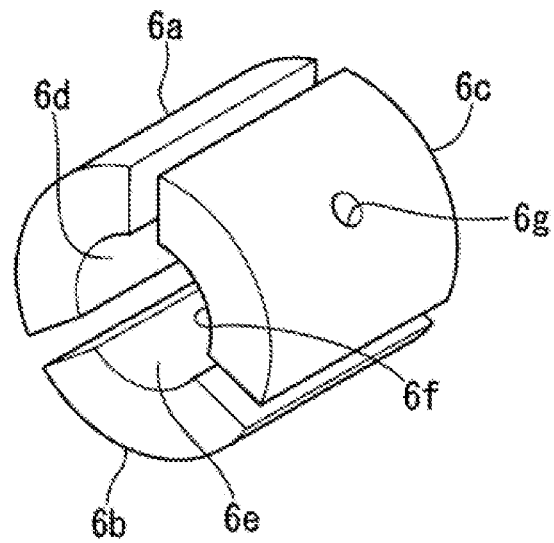
FIG. 2 (a) is an exploded perspective view of an intermediate jig; (b) is an explanatory diagram of an engine valve intermediate product equipped with a boss portion formed by cutting.
Figure 2:
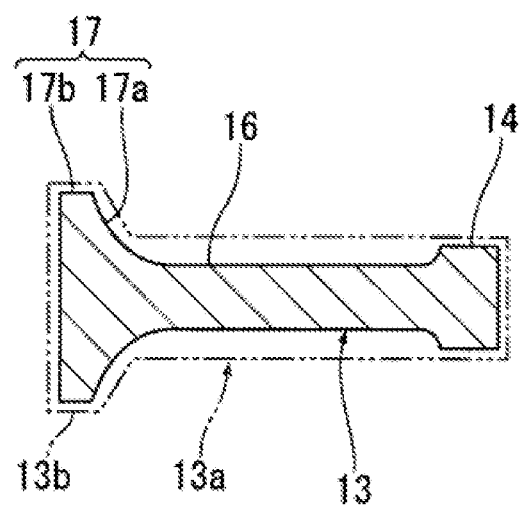

Intermediate jigs 6a through 6c shown at (a) in FIG. 2 are shaped after the fashion of a cylinder that has been split into three equal parts, each of which has a threaded hole 6g (a portion of which is not shown) for threadedly securing male-threaded screws, described below, which when assembled will permit stem forming portion 3 to be respectively gripped by inner circumferential surfaces 6d through 6f, and which are respectively capable of being removably installed in the radial direction relative to central axis 0 of stem forming portion 3 as shown at (c) in FIG. 1.

Valve head forming portion 4 shown at (c) in FIG. 1 is retained by valve head jig 7 which is in the shape of a cylinder that is closed at one end. Valve head jig 7 has retaining hole 7a with bottom 7b, face forming portion 4b being retained by retaining hole 7a when valve head forming portion 4 is inserted into retaining hole 7a in such fashion as to cause bottom face 4e to come in contact with bottom 7b. Furthermore, valve head jig 7 and intermediate jigs 6a through 6c which retain intermediate product 2 are retained by tip end jig 8 which is in the shape of a cylinder that is closed at one end.

Tip end jig 8 at (c) in FIG. 1 has retaining hole 8a with bottom 8b, valve head jig 7 which retains valve head forming portion 4 being such that outer circumferential surface 7d is retained by retaining hole 8a in such fashion as to cause tip end face 7c to come in contact with bottom 8b. Furthermore, tip end jig 8 has three (one of which is not shown) stepped insertion holes 8c that retain heads of male-threaded screws, described below, inserted therethrough at locations corresponding to female-threaded holes 6g in intermediate jigs 6a through 6c. Intermediate jigs 6a through 6c which retain stem forming portion 3 are inserted into retaining hole 8a of tip end jig 8 in such fashion as to cause the respective female-threaded holes 6g and stepped insertion holes 8c to be aligned, the outer circumferential surfaces thereof being retained by tip end jig 8 in such fashion as to be adjacent to valve head jig 7. Tip end jig 8 and intermediate jigs 6a through 6c are secured as a result of the fact that three male-threaded screws 9 (two of which are not shown) are inserted through stepped insertion holes 8c and threadedly engage with female-threaded holes 6g, and intermediate jigs 6a through 6c grip an intermediate location of stem forming portion 3 of intermediate product 2 in the vicinity of neck forming portion 4a in such fashion as to prevent relative rotation.

As shown at (c) in FIG. 1, because intermediate jigs 6a through 6c stably retain the intermediate product by retaining not face forming portion 4b which is of short length in the axial direction of valve head forming portion 4 but an intermediate location along stem forming portion 3, this contributes to manufacture of an intermediate product with boss portion of high precision at the stem enlarging operation, described below. Furthermore, since the plurality of intermediate jigs 6a through 6c can be removably installed in the radial direction, because they can be removably installed not only before stem forming portion 3 is retained by base end jig 5 but also after it has been retained thereby, there is increase in the degrees of freedom with respect to the time at which these are removably installed on stem forming portion 3.

Next, the stem enlarging operation which follows the stem retaining operation will be described in accordance with (d) and (e) at FIG. 1. For purposes of description, the stem enlarging operation will be divided into a first stem enlarging operation shown at (d) in FIG. 1 in which, as stem forming portion 3 of intermediate product 2 is made to rotate while it is bent in angular fashion, alternating stresses are applied to the bent location, and intermediate product 2 is compressed from both ends to cause a part of stem forming portion 3 to become enlarged; and a second stem enlarging operation shown at (e) in FIG. 1 in which intermediate product 2, at which part of the stem forming portion 3 has been enlarged, is bent back so as to be made linear to produce stem forming portion 3 with boss forming portion 10.

As shown at (d) in FIG. 1, during the first stem enlarging operation, tip end jig 8, which was made integral with intermediate product 2 during the stem retaining operation, causes intermediate product 2, the base end portion 3b of which is retained by base end jig 5, to be bent in angular fashion by angle θ with respect to the original central axis 0 of intermediate product 2 in the vicinity of base end faces 6h of intermediate jigs 6a through 6c, and a motor or other such rotary means, not shown, that has been made integral with intermediate product 2 rotates as intermediate product 2 is maintained in its bent state.

As shown at (d) in FIG. 1, at this time, the region in the vicinity of base end portion 3b of stem forming portion 3 at intermediate product 2 will, as a result of being retained by base end jig 5, rotate about original central axis 0; while simultaneously therewith, the region which is bent in angular fashion with respect to central axis 0 of intermediate product 2 will rotate about central axis 01 of valve head forming portion 4 which is inclined in angular fashion by θ with respect to central axis 0. At a part of stem forming portion 3 which is thus made to rotate, i.e., the region (hereinafter "boss forming portion 10") thereof from front face 5c of base end jig 5 to base end faces 6h of intermediate jigs 6a through 6c, the alternating loads impinging thereon due to the alternating tensile forces and compressive forces produced as a result of rotation of intermediate product 2 while it is maintained in a bent state are continuously applied to the outer circumferential surface and cause lowering of the yield stress thereof.

As shown at (d) in FIG. 1, intermediate product 2 which is made to rotate while bent is subjected to compressive forces from both ends as a result of being retained in such fashion that intermediate jigs 6a through 6c are prevented from moving in the direction of central axis 01, and as a result of being acted on by a force such as would tend to cause base end jig 5 to approach intermediate jigs 6a through 6c along central axis 0. The aforementioned compressive forces cause boss forming portion 10, at which the yield stress has been lowered, to become enlarged in radially outward fashion.

During the second stem enlarging operation shown at (d) in FIG. 1, at intermediate product 2, the boss forming portion 10 of which has been enlarged, stem forming portion 3, which was bent in angular fashion by angle θ as it was rotated, is bent back toward central axis 0 from central axis 01 so as to be made linear, causing boss forming portion 10 to assume the form of boss portion 11, the outside diameter of which is greater than that of stem forming portion 3.

As shown at (f) in FIG. 1, intermediate product 2, at which boss portion 11 has been formed in accordance with the stem enlarging operation, residual portion 3c in a region from a location in the vicinity of base end portion 11a of boss portion 11 to base end portion 3b of stem forming portion 3 is removed in accordance with the removal operation to produce intermediate product 2 with boss portion 11.

In accordance with the method of manufacturing intermediate product 2 with boss portion 11 of the present working example shown at (a) through (f) in FIG. 1, three intermediate jigs 6a through 6c capable of being removably installed in the radial direction of intermediate product 2 are employed to grip an intermediate location of stem forming portion 3, as a result of which not only is it possible to grip the intermediate product more stably than would be the case if face forming portion 4b, which is of short grippable length, were to be gripped, but, because it is possible, based on lengths L1 in the axial direction of the intermediate jigs and the locations of base end faces 6h when stem forming portion 3 is gripped thereby, to form boss portion 11 such that it is toward the base end portion from base end faces 6h, this is significant from the standpoint of ability to cause a boss portion that is separated by some distance from valve head forming portion 4 to be formed at any freely chosen location on stem forming portion 3.

Moreover, (b) at FIG. 2 shows an intermediate product 13 with boss portion 14 formed by cutting, a method of manufacturing intermediate product 13 with boss portion 14 formed by cutting being a method in which a rod made of metal comprising NCF80A or other such precipitation hardenable Ni-based alloy is subjected to forging to form primary intermediate product 13a of shape as indicated by the double-dash chain line and having precursor portion 13b for valve head forming portion 17, and the primary intermediate product 13a that is formed is subjected to cutting to form valve head forming portion 17, stem forming portion 16, and boss portion 14 at intermediate product 13. In such case, because regions of metal rod 15 other than the intermediate product 13 with boss portion 14 are discarded as a result of being removed by cutting from primary intermediate product 13a, much material is wasted with manufacturing methods in which boss portions are formed by cutting.

On the other hand, because intermediate product 13 at (b) in FIG. 2 is such that boss portion 14 is formed by cutting, the boss portion 14 obtained following cutting may be formed in such fashion as to have identical hardness as stem forming portion 16. Here, whereas at boss portion 14 there may be a need to achieve increased hardness such as will permit prescribed fatigue strength to be imparted thereto due to such reasons as the fact that the piston portion which is preferably able to withstand sliding is formed thereat, at neck forming portion 17a (the necked portion that is continuous with both the stem forming portion 16 and the face forming portion 17b) of valve head forming portion 17 there may be a need to suppress increase in hardness so as to prevent decrease in the toughness of the neck portion of the engine valve finished product and occurrence of damage to the neck portion due to impact.

To carry out heat treatment of boss portion 14 and increase the hardness thereof, one approach is to place the entire intermediate product 13 (or engine valve finished product) in a heat treatment furnace. However, where this is done, there may be a problem in that when the entire intermediate product is placed in a heat treatment furnace, neck forming portion 17a, because it may also be made to undergo heat treatment, may also be made to have increased hardness equivalent to that of boss portion 14, as a result of which the toughness thereof may be lowered.

In accordance with the method of manufacturing intermediate product 2 with boss portion 11 of the present working example shown at (a) through (f) in FIG. 1, only boss portion 11 formed at intermediate product 2 undergoes work hardening as a result of application of alternating loads, neither stem forming portion 3 nor valve head forming portion 4 which includes neck forming portion 4a undergoing work hardening as a result of application of alternating loads. Accordingly, the increase in hardness which is produced thereby is such as to cause only the fatigue strength (Vickers hardness) of boss portion 11 to increase to the required fatigue strength, and the toughness at stem forming portion 3 and valve head forming portion 4 inclusive of neck forming portion 4a, at which increase in hardness has been suppressed, is not lowered but is maintained.

Figure 1A:
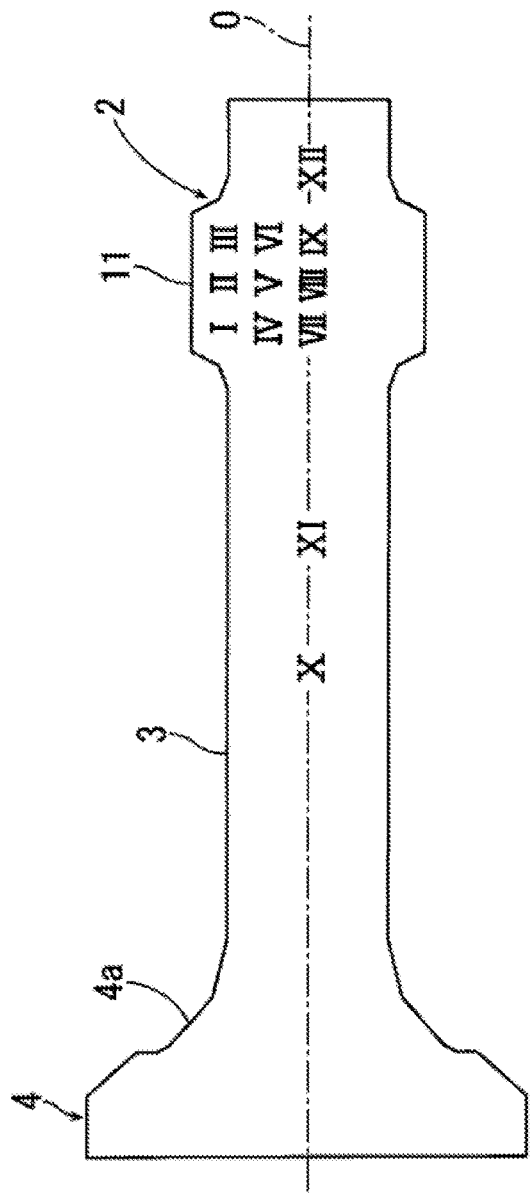
FIG. 1A is an explanatory diagram including table showing hardness at various locations of a boss portion when an engine valve intermediate product with a boss portion is formed by a cutting operation in which a part is cut from a solid blank and/or stem enlarging operation.

The diagram in the upper portion of FIG. 1A shows an engine valve intermediate product 2 with boss portion formed from material in the form of NCF80A or other such precipitation hardenable Ni-based alloy, and the table appearing in the lower portion of FIG. 1A indicates values related to the hardness (Vickers hardness; expressed in units of HV) at various locations of boss portion 11. The diagram in the upper portion of FIG. 1A shows locations I through XII at which hardness of the stem forming portion 3 and boss portion 11 of an intermediate product 2 was measured, reference numerals I through III at boss portion 11 indicating locations in the vicinity of the outer circumferential surface of boss portion 11; reference numerals VII through IX indicating locations in the vicinity of central axis 0 of boss portion 11; and reference numerals IV through VI indicating locations intermediate between the center and the outer circumferential surface of boss portion 11. Furthermore, at FIG. 1A, reference numerals X and XI indicate locations bounded by valve head forming portion 4 and boss portion 11 at stem forming portion 3; and reference numeral XII indicates the base end portion of stem forming portion 3.

The graph at the bottom of FIG. 1A shows hardnesses a at respective locations X through XII of stem forming portion 3 and respective locations I through X of boss portion 11 formed at intermediate product 2 by the first and second stem enlarging operations in accordance with the present working example at the top end; hardnesses b at I through XII of stem forming portion 3 and boss portion 11 formed by cutting; and the values of a/b.

FIG. 1A indicates that whereas hardnesses at boss portion 11 of intermediate product 2 formed by cutting material in the form of NCF80A or other such precipitation hardenable Ni-based alloy were 310 HV to 330 HV at respective locations corresponding to reference numerals I through IX, hardnesses at boss portion 11 of intermediate product 2 formed by the first and second stem enlarging operations were 437 HV to 508 HV at respective locations corresponding to reference numerals I through IX. Accordingly, notwithstanding that the same NCF80A or other such precipitation hardenable Ni-based alloy was used as material, boss portion 11 formed by the first and second stem enlarging operations had hardnesses that were 1.37 to 1.64 times those of boss portion 11 formed by cutting the part from a solid blank, this being significant in that increase in the hardness of boss portion 11 was achieved even without causing it to be subjected to heat treatment.

On the other hand, because FIG. 1A indicates that hardnesses at stem forming portion 3 of intermediate product 2 formed by causing material in the form of NCF80A or other such precipitation hardenable Ni-based alloy to undergo the first and second stem enlarging operations were 350 HV to 356 HV as indicated at the respective locations corresponding to reference numerals X through XII, while a slight increase in hardness which was 1.09 to 1.12 times that of the hardnesses of 312 HV to 320 HV at the respective locations corresponding to reference numerals X through XII at stem forming portion 3 of intermediate product 2 formed when the same material was subjected to cutting was observed, the hardnesses of 350 HV to 356 HV at the stem forming portion 3 produced by the first and second stem enlarging operations were suppressed, being low, as compared with the hardnesses of 437 HV to 508 HV at the boss portion 11 produced by the first and second stem enlarging operations.

Furthermore, because the hardnesses at stem forming portion 3 in the region between valve head forming portion 4 and boss portion 11 produced by the first and second stem enlarging operations indicated in FIG. 1A were lower the nearer the location was to valve head forming portion 4 (the hardness of 350 HV at the location corresponding to reference numeral X which indicates a location intermediate between boss portion 11 and valve head forming portion 4 was less than the hardness of 356 HV at the location corresponding to reference numeral XI which indicates a location intermediate between boss portion 11 and the foregoing intermediate location), it is fair to say that neck forming portion 4a of valve head forming portion 4 tended to be even less susceptible to the influence of alternating stresses than stem forming portion 3 which is continuous with boss portion 11. Accordingly, not only does the method of manufacturing an engine valve intermediate body in accordance with the present working example make it possible to cause hardening of only boss portion 11 and increase in only the strength of the piston portion and/or vane portion in the finished product to the required strength, it is also significant in that it makes it possible to suppress hardening of neck forming portion 4a such that toughness of the neck portion and so forth in the finished product is not lowered but is maintained.

The method of manufacturing an engine valve intermediate product in accordance with the present working example thus not only makes it possible to cause the hardness of boss portion 11 to be increased more than that of stem forming portion 3 by the work hardening that is produced at boss portion 11 during the stem enlarging operation and obtain the high fatigue strength which is required in the piston portion and/or vane portion of the finished product, but because it also makes it possible for the hardness of the neck portion and so forth to be maintained and for same to be imparted with the required toughness, also makes it possible to manufacture an engine valve equipped with a vane portion and/or boss portion that is of high performance.

Moreover, the intermediate jigs employed at the first working example may be constituted from two or from four or more intermediate jigs that retain the outer circumferential surface of stem forming portion 3, and while it is possible for these to be formed such that they are shaped after the fashion of a cylinder that has been split into three unequal parts, from the standpoint of reducing the tendency for forces to be dissipated toward the exterior in the radial direction when the intermediate jigs retain stem forming portion 3, it is preferred that these be arranged at not less than three locations, and from the standpoint of causing retention of stem forming portion 3 by the respective jigs to be accomplished by way of uniform forces, it is preferred as in the present working example that these be arranged with uniform spacing about the outside circumference of the stem forming portion.

Furthermore, it is preferred that the plurality of intermediate jigs 6a through 6c employed at the first working example and shown at (a) in FIG. 2 be formed so as to have hardnesses of not less than 500 HV as a result of having respectively been made to undergo surface treatment and/or heat treatment. Causing intermediate jigs 6a through 6c to be formed so as to have hardnesses of not less than 500 HV will make it possible for boss portion 11 to be formed at intermediate product 2 without occurrence of buckling at the respective intermediate jigs.

Furthermore, whereas at the first working example an intermediate location at stem forming portion 3 was gripped and secured by intermediate jigs 6a through 6c while base end portion 3b of the stem forming portion was retained by base end jig 5 in such fashion as to permit relative rotation, it is conversely possible to cause base end portion 3b of the stem forming portion to be gripped and secured by base end jig 5 while an intermediate location at stem forming portion 3 is retained by intermediate jigs 6a through 6c in such fashion as to permit relative rotation. In such case, intermediate product 2 would together with tip end jig 8 be inclined in angular fashion at angle θ with respect to central axis 0, and boss portion 11 would be formed at stem forming portion 3 by applying a compressive force to base end jig 5 such as will tend to cause it to approach intermediate jigs 6a through 6c while a motor or the like, not shown, is used to cause base end jig 5 to rotate.

Next, a second working example related to a method of manufacturing an engine valve utilizing an intermediate product with a boss portion manufactured in accordance with the first working example will be described in accordance with (a) to (c) at FIG. 3. Intermediate product 2 with boss portion 11 shown at (f) in FIG. 1 is made integral with stem end member 18 shown at (a) in FIG. 3 to constitute second intermediate product 26. Because stem end member 18 does not tend to be exposed to impact and high temperature to the same extent as intermediate product 2, and because high hardness is not required of it to the extent that it is of intermediate product 2, it may be formed by cutting and/or forging a rod made of a metal that, as compared with that employed at intermediate product 2, is cheaper than NCF80A or other such precipitation hardenable Ni-based alloy; e.g., a metal rod made of SUH3 or other such steel. Stem end member 18 is formed so as to have second boss portion 19 at which the outside diameter is equal to that of boss portion 11 of intermediate product 2, and stem end forming portion 20 at which the outside diameter is less than that of second boss portion 19.

Figure 3:
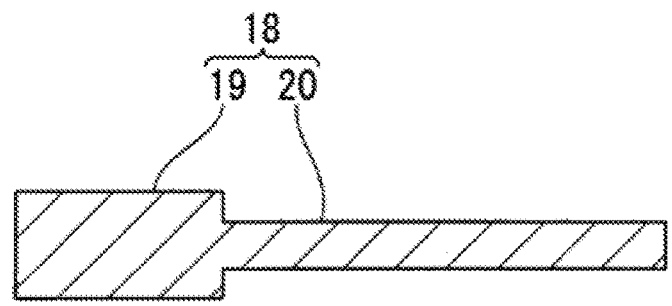
FIG. 3 illustrates manufacturing operations related to a second working example showing a method of manufacturing an engine valve through use of an intermediate product equipped with a boss portion, (a) showing an axial sectional view of an engine valve stem end member formed by cutting; (b) showing a friction welding operation in which the stem end member that was formed is joined to the intermediate product equipped with the boss portion to form a second intermediate product; and (c) showing a side view of an engine valve finished product formed as a result of machining the stem end member and the intermediate product equipped with a boss portion that were joined.
Figure 3:
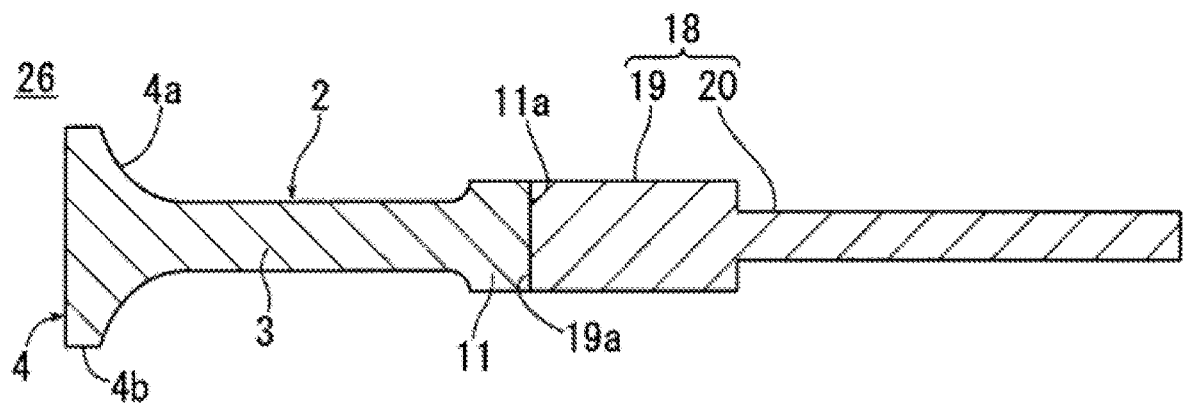
Figure 3:
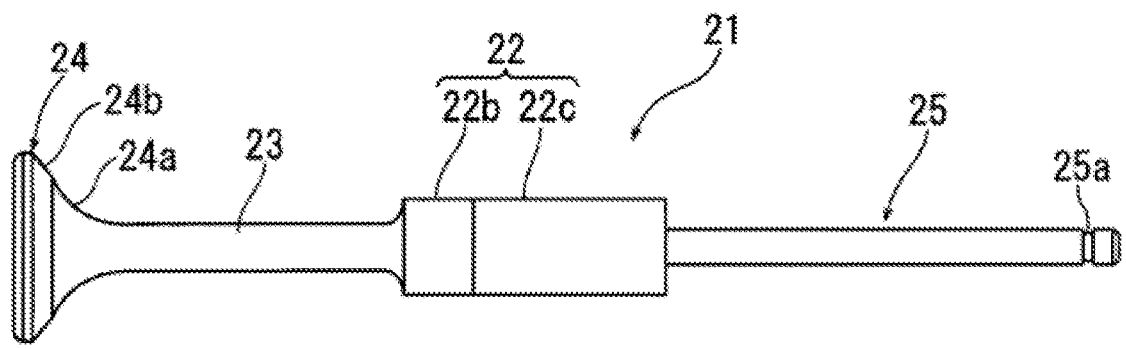

As shown at (b) in FIG. 3, by causing stem end member 18 to be friction-welded to intermediate product 2 in such state that base end portion 11a of boss portion 11 is made to come in contact with tip end portion 19a of second boss portion 19, intermediate product 2 is made integral and coaxial with stem end member 18. The entirety of second intermediate product 26 produced as a result of making intermediate product 2 integral with stem end member 18 is subjected to annealing, and is thereafter made to undergo treatment for correction of strain.

At the present working example, following correction of strain, the outer circumferential surface of second intermediate product 26 at (b) in FIG. 3 is machined to form engine valve 21 with piston 22 at (c) in FIG. 3. Stem forming portion 3 is made to form stem portion 23, and valve head forming portion 4 is made to form valve head portion 24. Neck forming portion 4a of valve head portion 24 is made to form neck portion 24a which increases in diameter in concave fashion as one proceeds toward the tip end, and face forming portion 4b is made to form face portion 24b which increases in diameter in tapered fashion as one proceeds toward the tip end.

Furthermore, as shown at (c) in FIG. 3, boss portion 11 and second boss portion 19 which have been made integral are made to form piston 22, and stem end forming portion 20 is made to form stem end portion 25 which has cotter groove 25a.

Piston 22 of engine valve 21 at the second working example engages in sliding motion as a result of hydraulic pressure or the like, and is constituted from tip end portion region 22b comprising boss portion 11, and from base end portion region 22c comprising second boss portion 19, tip end portion region 22b being formed from NCF80A or other such precipitation hardenable Ni-based alloy, the hardness of which has been increased as a result of work hardening, and base end portion region 22c being formed from SUH3 or other such steel which is cheaper than the material employed at the tip end portion region.

As tip end portion region 22b of piston 22 is near valve head portion 24, it tends to be affected by way of intervening stem portion 23 by the heat from valve head portion 24 which is affected by the high temperatures within the combustion chamber. However, a piston portion in accordance with the present working example will have the advantage that not only is the hardness of tip end portion region 22b high and not only does it have high fatigue strength with respect to sliding, but it also has excellent strength at elevated temperatures. On the other hand, because the heat which is generated at base end portion region 22c of piston 22 of the present working example will tend to be more easily dissipated than that of tip end portion region 22b from stem end portion 25 to the crankcase (not shown) that is in contact therewith, neither base end portion region 22c nor stem end portion 25 will require strength at elevated temperatures to the same extent as tip end portion region 22b.

In accordance with the second working example, stem end portion 25 and base end portion region 22c of piston 22 are formed from SUH3 or other such steel which is cheaper than NCF80A or other such precipitation hardenable Ni-based alloy and are joined in integral fashion to base end portion region 22c which is formed from NCF80A or other such precipitation hardenable Ni-based alloy. Engine valve 21 formed by an engine valve manufacturing method in accordance with the present working example has the advantage that it is provided with the required strength at elevated temperatures at tip end portion region 22b of piston 22, stem portion 23, and valve head portion 24 which reach elevated temperatures, and moreover that by causing stem end portion 25 and base end portion region 22c of piston 22 which do not reach elevated temperatures to be formed from inexpensive member(s) and causing these to be joined to tip end portion region 22b, it is made capable of being formed in cheaper fashion than would be the case were the entire engine valve 21 to be formed from a high-strength expensive material such as NCF80A or other such precipitation hardenable Ni-based alloy.

Figure 4:
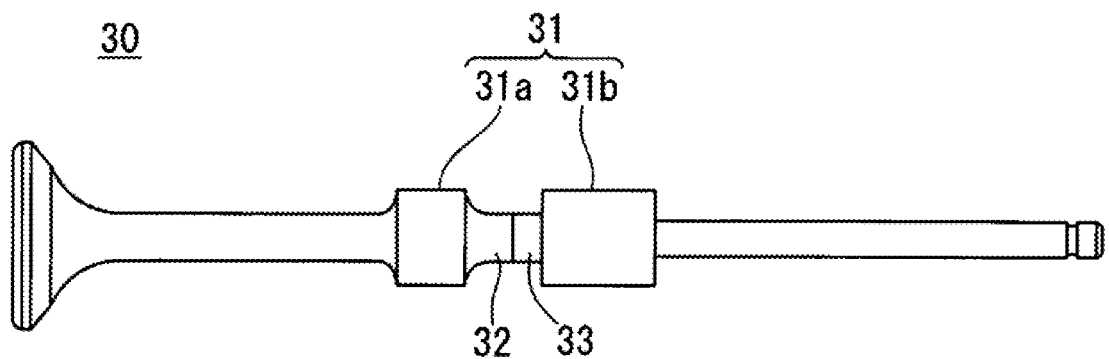
FIG. 4 shows a side view of an engine valve equipped with a piston formed in accordance with a variation on a method of manufacturing an engine valve through use of an intermediate product equipped with a boss portion.

FIG. 4 shows engine valve 30 with piston 31 that has been formed in accordance with a variation on the method of manufacturing an intermediate product with boss portion in accordance with the first working example and in accordance with a variation on the method of manufacturing an engine valve in accordance with the second working example. Engine valve 30 may be manufactured as follows. First, whereas the method of manufacturing an intermediate product with boss portion in accordance with the first working example was such that a removal operation was carried out as shown at (f) in FIG. 1 and residual portion 3c was removed from stem forming portion 3 of intermediate product 2, in accordance with the present variation the removal operation is not carried out and the residual portion is allowed to remain where it is. Furthermore, whereas the method of manufacturing an engine valve in accordance with the second working example shown at (a) and (b) in FIG. 3 was such that nothing was provided toward the tip end from second boss portion 19 of stem end member 18, in accordance with the present variation the tip end of second boss portion 19 is provided with a connecting portion having an outside diameter that is the same as that of the residual portion, and the residual portion and the connecting portion are friction-welded together. The other operations of the present variation are the same as at the first and second working examples.

As a result, piston 31 of engine valve 30 shown in FIG. 4 is constituted from first piston 31a and second piston 31b which are separated by some distance in the front-to-back direction such that residual portion 32 and connecting portion 33 are straddled therebetween. In accordance with the method of manufacturing engine valve 30 of the present variation, piston 31 is divided in two with clearance being provided therebetween, reduction in the sliding area making it possible to reduce sliding resistance of the piston when this is driven by hydraulic pressure or the like. Because causing connecting portion 33 to be provided as part of the stem end member 18 cutting operation will result in one less operation, i.e., the operation for removal of the residual portion that would otherwise have been performed during manufacture of the intermediate product, this will permit reduction in the cost of manufacturing engine valve 30 with piston 31. Note that connecting portion 33 need not be provided. In such case, by causing residual portion 32 to be directly and coaxially friction-welded to second piston 31b, the number of man-hours required to manufacture connecting portion 33 can be reduced, permitting reduction in manufacturing cost.

Figure 5:
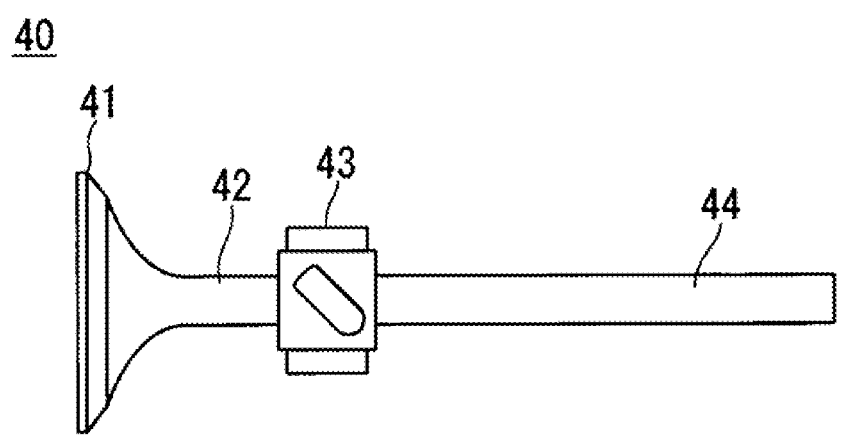
FIG. 5 shows a side view of an engine valve equipped with a vane portion formed in accordance with a variation on a method of manufacturing an engine valve through use of an intermediate product equipped with a boss portion.

FIG. 5 shows engine valve 40 with vane portion 43 in accordance with a variation on the method of manufacturing an intermediate product with boss portion in accordance with the first working example and the method of manufacturing an engine valve in accordance with the second working example. Engine valve 40, at which vane portion 43 formed from boss portion, stem portion 42, and valve head portion 41 are formed on intermediate product 2 at (f) in FIG. 1 manufactured in accordance with the manufacturing method of the first working example, is formed from SUH3 or other such steel. Because engine valve 40 is used as an exhaust valve, vane portion 43 being arranged in an exhaust gas passage (not shown), it is necessary at the method used to manufacture engine valve 40 such that lengths L1 in the axial direction of intermediate jigs 6a through 6c employed at the respective operations shown at (c) through (e) in FIG. 1 be formed so as to be shorter than they were at the first working example, such that base end faces 6h are withdrawn toward the tip end, so that vane portion 43 is formed so as to be near valve head portion 41.

EXPLANATION OF REFERENCE NUMERALS

2 Intermediate product
3 Stem forming portion
3a Tip end portion
3b Base end portion
5 Base end jig
6a through 6c Intermediate jigs
11 Boss portion
18 Stem end member
19 Second boss portion
26 Second intermediate product

What is claimed is:
1. A method of manufacturing an engine valve intermediate product with a boss portion at which a valve head forming portion consisting of a neck forming portion that is formed so as to increase in diameter in concave fashion as one proceeds from a base end portion which is continuous with the stem forming portion toward a tip end portion, and a face forming portion that is continuous with the tip end portion of the neck forming portion, are present in integral fashion at a tip end portion of the stem forming portion, and at which the boss portion, an outside diameter of which is greater than that of the stem forming portion, is formed in integral fashion at an outer circumferential surface at an intermediate location at the stem forming portion, the method of manufacturing the engine valve intermediate product with the boss portion being characterized in that it comprises:
a stem retaining operation in which
a face forming portion, an outside diameter of which is greater than that of the stem forming portion of the intermediate product, is inserted in and retained by a retaining hole of a valve head jig in such fashion as to cause a bottom face of the valve head forming portion of the intermediate product to come in contact with a bottom of the valve head jig which is in a shape of a cylinder that is closed at one end, the intermediate location of the stem forming portion is retained by a plurality of intermediate jigs capable of being removably installed radially with respect to a center of the stem forming portion of the intermediate product, the valve head jig is inserted in and an outer circumferential surface thereof is retained by a retaining hole of a tip end jig which is in a shape of a cylinder that is closed at one end and the plurality of intermediate jigs are further inserted in and outer circumferential surfaces thereof are retained by the retaining hole of the tip end jig, and a base end portion of the stem forming portion is retained by a base end jig; and a stem enlarging operation in which compressive forces are applied from both ends of the intermediate product and the boss portion is formed as the stem forming portion of the intermediate product is made to rotate while it is bent in angular fashion by base end faces of the intermediate jigs and alternating loads that cause tensile forces and compressive forces to act in repeated and alternating fashion in a direction parallel to a central axis of the stem at the outer circumferential surface of the stem forming portion are applied thereto.

2. The method of manufacturing the engine valve intermediate product with the boss portion according to claim 1 characterized in that the plurality of intermediate jigs are formed so as to have hardnesses of not less than 500 HV as a result of having been made to undergo surface treatment and/or heat treatment, and the intermediate location of the stem forming portion is retained at not less than three locations in a circumferential direction of the stem forming portion.

3. The method of manufacturing the engine valve intermediate product with the boss portion according to claim 2 characterized in that the plurality of intermediate jigs retain the intermediate location of the stem forming portion in such state as to be arranged in equipartite fashion about the circumferential direction of the stem forming portion.

4. The method of manufacturing the engine valve intermediate product with the boss portion according to claim 2 characterized in that the engine valve intermediate product with the boss portion is formed from precipitation hardenable Ni-based alloy.

5. The method of manufacturing the engine valve intermediate product with the boss portion according to claim 2 characterized in that it further comprises a friction welding operation in which a second boss portion of a stem end member equipped with the second boss portion which is formed from a different material that is martensite steel is joined to the boss portion of the intermediate product to form a secondary intermediate product.

6. The method of manufacturing the engine valve intermediate product with the boss portion according to claim 2 characterized in that:

the valve head forming portion has a neck forming portion; and the neck forming portion is formed in integral fashion so as to be continuous with the tip end portion of the stem forming portion, and so as to be of such shape as to increase in diameter as one proceeds from the tip end portion of the stem forming portion toward a tip end of the neck forming portion.

7. The method of manufacturing the engine valve intermediate product with the boss portion according to claim 1 characterized in that the plurality of intermediate jigs retain the intermediate location of the stem forming portion in such state as to be arranged in equipartite fashion about the circumferential direction of the stem forming portion.

8. The method of manufacturing the engine valve intermediate product with the boss portion according to claim 1 characterized in that the engine valve intermediate product with the boss portion is formed from precipitation hardenable Ni-based alloy.

9. The method of manufacturing the engine valve intermediate product with the boss portion according to claim 1 characterized in that it further comprises a friction welding operation in which a second boss portion of a stem end member equipped with the second boss portion which is formed from a different material that is martensite steel is joined to the boss portion of the intermediate product to form a secondary intermediate product.

10. The method of manufacturing the engine valve intermediate product with the boss portion according to claim 1 characterized in that:

the valve head forming portion has a neck forming portion; and the neck forming portion is formed in integral fashion so as to be continuous with the tip end portion of the stem forming portion, and so as to be of such shape as to increase in diameter as one proceeds from the tip end portion of the stem forming portion toward a tip end of the neck forming portion.

\* \* \* \* \*